US011624807B2

(12) United States Patent
Luff et al.

(10) Patent No.: US 11,624,807 B2
(45) Date of Patent: Apr. 11, 2023

(54) IMAGE DISTANCE IN LIDAR SYSTEMS

(71) Applicant: SiLC Technologies, Inc., Monrovia, CA (US)

(72) Inventors: Bradley Jonathan Luff, La Canada Flintridge, CA (US); Dazeng Feng, El Monte, CA (US); Mehdi Asghari, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 708 days.

(21) Appl. No.: 16/698,769

(22) Filed: Nov. 27, 2019

(65) Prior Publication Data

US 2020/0182973 A1    Jun. 11, 2020

Related U.S. Application Data

(60) Provisional application No. 62/778,217, filed on Dec. 11, 2018.

(51) Int. Cl.
| | |
|---|---|
| *G01S 7/481* | (2006.01) |
| *G01S 17/89* | (2020.01) |
| *G01S 17/06* | (2006.01) |
| *G01S 17/58* | (2006.01) |

(52) U.S. Cl.
CPC .......... *G01S 7/4814* (2013.01); *G01S 7/4817* (2013.01); *G01S 17/06* (2013.01); *G01S 17/58* (2013.01); *G01S 17/89* (2013.01)

(58) Field of Classification Search
CPC ...... G01S 7/4814; G01S 7/4817; G01S 17/06; G01S 17/58; G01S 17/89; G01S 7/497; G01S 17/93

USPC ........................................................ 356/5.01
See application file for complete search history.

(56) References Cited

U.S. PATENT DOCUMENTS

| | | | |
|---|---|---|---|
| 8,311,374 B2 | 11/2012 | Hochberg et al. | |
| 9,157,790 B2 | 10/2015 | Shpunt et al. | |
| 9,235,097 B2 | 1/2016 | Meade et al. | |
| 9,310,471 B2 | 4/2016 | Sayyah et al. | |
| 9,753,351 B2 | 9/2017 | Eldada | |
| 9,841,495 B2 | 12/2017 | Campbell et al. | |
| 2019/0346568 A1 | 11/2019 | Feng et al. | |
| 2019/0369244 A1 | 12/2019 | Asghari et al. | |
| 2019/0369251 A1 | 12/2019 | Feng et al. | |
| 2019/0391242 A1 | 12/2019 | Asghari et al. | |

FOREIGN PATENT DOCUMENTS

WO    2016/097409 A2    6/2016

OTHER PUBLICATIONS

Baghmisheh, B. B., "Chip-scale Lidar", 2017, University of California, Berkeley.

(Continued)

*Primary Examiner* — Md M Rahman
(74) *Attorney, Agent, or Firm* — Gavrilovich, Dodd & Lindsey LLP

(57) ABSTRACT

A LIDAR system includes a LIDAR chip configured to generate a LIDAR output signal that exits from a waveguide on the LIDAR chip. The system also includes optics that receive the LIDAR output signal from the waveguide. Electronics are configured to tune an image distance at which the LIDAR output signal is focused after exiting from the optics.

14 Claims, 6 Drawing Sheets

(56) References Cited

OTHER PUBLICATIONS

Copenheaver, Blaine R., International Search Report and Written Opinion, PCT/US2019/063763, United States Patent and Trademark Office, dated Feb. 3, 2020.

Issakov, V. "Radar Systems, Ch. 2. In Microwave Circuits for 24GHz Automotive Radar in Silicon-based Technologies", 2010, Berlin Heidelberg: Springer-Verlag.

Li, L., "Time-of-Flight Camera—An Introduction", 2014, TI Technical White Paper SLOA190B.

Self, "Focusing of spherical Gaussian beams", Applied Optics, Mar. 1, 1983, vol. 22, No. 5, pp. 658-661.

Velodyne, "HDL-64E S2 Datasheet. Retrieved from http://velodynelidar.com/lidar/products/brochure/HDL-64E%20S2%20datasheet_2010_lowres.pdr", 2017.

http://www.pi-usa.us/products/PDF_Data/Q-522_Mini_Positioning_Stage_20150203.pdf, Retrieved from PI USA, 2018.

http://www.pi-usa.us/products/PDF_Data/S335_Fast_Tip-Tilt_Platform.pdf, Retrieved from PI USA, 2018.

IMAGE DISTANCE IN LIDAR SYSTEMS

RELATED APPLICATIONS

This application claims the benefit of U.S. Patent Application Ser. No. 62/778,217, filed on Dec. 11, 2018, entitled "LIDAR System," and incorporated herein in its entirety.

FIELD

The invention relates to optical devices. In particular, the invention relates to LIDAR systems.

BACKGROUND

A variety of LIDAR (Light Detection and Ranging) systems sequentially illuminate different sample regions in a field of view with a LIDAR output signal. The field of view is generally treated as a spot, line, or plane that is located a field distance away from the source of the LIDAR output signal. The resolution of these systems increases as the spot size of the LIDAR output signal at the field desired distance decreases.

Many LIDAR systems make use of collimated LIDAR output signals. Collimated LIDAR output signals quickly spread as they travel. The degree of spread increases over increasing distances. As a result, these LIDAR systems lose resolution at practical distances. For these reasons, there is a need for LIDAR systems with improved levels of resolution.

SUMMARY

A LIDAR system includes a LIDAR chip configured to generate a LIDAR output signal that exits from a waveguide on the LIDAR chip. The system also includes optics that receive the LIDAR output signal from the waveguide. Electronics are configured to tune an image distance at which the LIDAR output signal is focused after exiting from the optics.

A method of operating a LIDAR system includes tuning an image distance at which a LIDAR output signal to be generated by a LIDAR chip is focused. The method also includes generating the LIDAR output signal such that the LIDAR output signal is focused at the image distance. LIDAR data is generated from light that was included in the LIDAR output signal. The LIDAR data includes the radial distance and/or radial velocity between the LIDAR chip and an object that reflected the LIDAR output signal and is located remotely from the LIDAR chip.

BRIEF DESCRIPTION OF THE FIGURES

FIG. 6B is a topview of the LIDAR system.

FIG. 6C is a cross section of the LIDAR system taken along the longitudinal axis of a utility waveguide on the LIDAR chip.

DESCRIPTION

A LIDAR system includes a LIDAR chip a such as a Photonic Integrated Circuit (PIC). The LIDAR chip can generate a LIDAR output signal. The LIDAR system includes electronics that generate LIDAR data from light that was included in the LIDAR output signal. The system also includes optics that receive the LIDAR output signal from the LIDAR chip and focus the LIDAR output signal. The electronics are configured to tune the focal distance at which the LIDAR output signal is focused. The electronics can tune the focal distance for fields of view located at different field distances. As a result, the focal distance can be tuned so as to move the focal point closer to the field of view. Moving the focal point closer to the field of view reduces the width of the LIDAR output signal at the field of view and accordingly increases the resolution that can be achieved by the LIDAR system.

Figure 1:
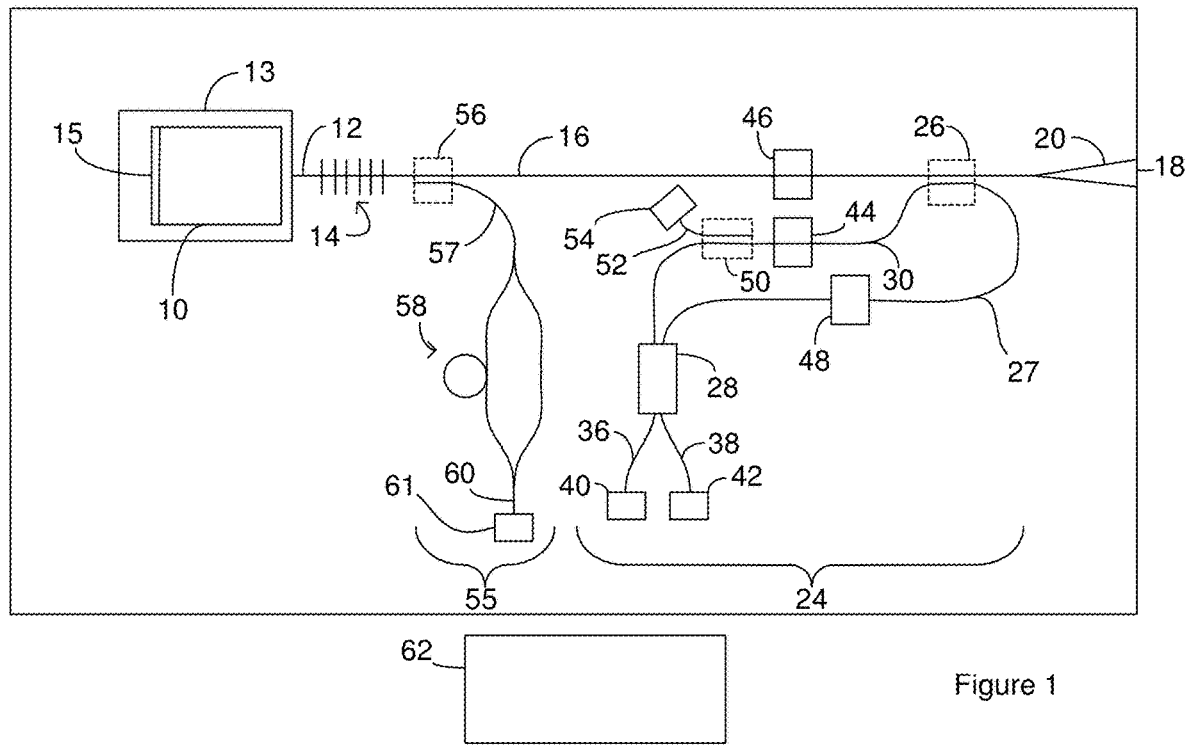
FIG. 1 is a top view of a LIDAR chip.

FIG. 1 is a topview of a LIDAR chip that includes a laser cavity. The laser cavity includes a light source 10 that can include or consist of a gain medium (not shown) for a laser. The chip also includes a cavity waveguide 12 that receives a light signal from the light source 10. The light source can be positioned in a recess 13 so a facet of the light source is optically aligned with a facet of the cavity waveguide 12 to allow the light source and cavity waveguide 12 to exchange light signals. The cavity waveguide 12 carries the light signal to a partial return device 14. The illustrated partial return device 14 is an optical grating such as a Bragg grating. However, other partial return devices 14 can be used; for instance, mirrors can be used in conjunction with echelle gratings and arrayed waveguide gratings.

The partial return device 14 returns a return portion of the light signal to the cavity waveguide 12 as a return signal. For instance, the cavity waveguide 12 returns the return signal to the light source 10 such that the return portion of the light signal travels through the gain medium. The light source 10 is configured such that at least a portion of the return signal is added to the light signal that is received at the cavity waveguide 12. For instance, the light source 10 can include a highly, fully, or partially reflective device 15 that reflects the return signal received from the gain medium back into the gain medium. As a result, light can resonate between the partial return device 14 and the reflective device 15 so as to form a Distributed Bragg Reflector (DBR) laser cavity. A DBR laser cavity has an inherently narrow-linewidth and a longer coherence length than DFB lasers and accordingly improves performance when an object reflecting the LIDAR output signal from the chip is located further away from the chip.

The partial return device 14 passes a portion of the light signal received from the cavity waveguide 12 to a utility waveguide 16 included on the chip. The portion of the light signal that the utility waveguide 16 receives from the partial return device 14 serves as the output of the laser cavity. The output of the laser cavity serves as an outgoing LIDAR signal on the utility waveguide 16. The utility waveguide 16 terminates at a facet 18 and carries the outgoing LIDAR signal to the facet 18. The facet 18 can be positioned such that the outgoing LIDAR signal traveling through the facet 18 exits the chip and serves as a LIDAR output signal. For instance, the facet 18 can be positioned at an edge of the chip so the outgoing LIDAR signal traveling through the facet 18 exits the chip and serves as a LIDAR output signal.

The LIDAR output signal travels away from the chip and is reflected by objects in the path of the LIDAR signal. The reflected signal travels away from the objects. At least a portion of the reflected signal returns to the facet 18 of the utility waveguide 16. Accordingly, a portion of the reflected signal can enter the utility waveguide 16 through the facet 18 and serve as a LIDAR input signal guided by the utility waveguide 16.

The utility waveguide 16 can include a tapered portion before the facet 18. For instance, the utility waveguide 16 can include a taper 20 that terminate at the facet 18. The taper 20 can relax the alignment tolerances required for efficient coupling of the utility waveguide 16 to the LIDAR input light and the outgoing LIDAR signal. Accordingly, the taper 20 can increase the percentage of the LIDAR input signal that is successfully returned to the chip for processing. In some instances, the taper 20 is constructed such that the facet 18 has an area that is more than two, five, or ten times the area of a cross section of a straight portion of the utility waveguide 16. Although FIG. 1 shows the taper 20 as a horizontal taper, the taper 20 can be a horizontal and/or vertical taper. The horizontal and/or vertical taper can be linear and/or curved. In some instances, the taper 20 is an adiabatic taper.

The chip includes a data branch 24 where the optical signals that are processed for LIDAR data (the radial distance and/or radial velocity between the LIDAR chip and the object reflecting the LIDAR output signal) are generated. The data branch includes an optical coupler 26 that moves a portion of the light signals from the utility waveguide 16 into the data branch. For instance, an optical coupler 26 couples a portion of the outgoing LIDAR signal from the utility waveguide 16 onto a reference waveguide 27 as a reference signal. The reference waveguide 27 carries the reference signal to a light-combining component 28.

The optical coupler 26 also couples a portion of the LIDAR input signal from the utility waveguide 16 onto a comparative waveguide 30 as a comparative signal. The comparative signal includes at least a portion of the light from the LIDAR input signal. The comparative signal can exclude light from the reference light signal. The comparative waveguide 30 carries the comparative signal to the light-combining component 28.

The illustrated optical coupler 26 is a result of positioning the utility waveguide 16 sufficiently close to the reference waveguide 27 and the comparative waveguide 30 that light from the utility waveguide 16 is coupled into the reference waveguide 27 and the comparative waveguide 30; however, other signal tapping components can be used to move a portion of the of the light signals from the utility waveguide 16 onto the reference waveguide 27 and the comparative waveguide 30. Examples of suitable signal tapping components include, but are not limited to, y-junctions, multi-mode interference couplers (MMIs), and integrated optical circulators.

The light-combining component 28 combines the comparative signal and the reference signal into a composite signal. The reference signal includes light from the outgoing LIDAR signal. For instance, the reference signal can serve as a sample of the outgoing LIDAR signal. The reference signal can exclude light from the LIDAR output signal and the LIDAR input signal. In contrast, the comparative signal light includes light from the LIDAR input signal. For instance, the comparative signal can serve as a sample of the LIDAR input signal. Accordingly, the comparative signal has been reflected by an object located off of the chip while the LIDAR output signal has not been reflected. When the chip and the reflecting object are moving relative to one another, the comparative signal and the reference signal have different frequencies due to the Doppler effect. As a result, beating occurs between the comparative signal and the reference signal.

The light-combining component 28 also splits the resulting composite sample signal onto a first detector waveguide 36 and a second detector waveguide 38. The first detector waveguide 36 carries a first portion of the composite sample signal to a first light sensor 40 that converts the first portion of the composite sample signal to a first electrical signal. The second detector waveguide 38 carries a second portion of the composite sample signal to a second light sensor 42 that converts the second portion of the composite sample signal to a second electrical signal. Examples of suitable light sensors include germanium photodiodes (PDs), and avalanche photodiodes (APDs).

The light combining component 28, the first light sensor 40 and the second light sensor 42 can be connected as a balanced photodetector that outputs an electrical data signal. For instance, the light combining component 28, the first light sensor 40 and the second light sensor 42 can be connected such that the DC components of the signal photocurrents cancel, improving detection sensitivity. Suitable methods for connecting the first light sensor 40 and the second light sensor 42 as balanced photodetectors includes connecting the first light sensor 40 and the second light sensor 42 in series. In one example, the first light sensor 40 and the second light sensor 42 are both avalanche photodiodes connected in series. Balanced photodetection is desirable for detection of small signal fluctuations.

An example of a suitable light-combining component 28 is a Multi-Mode Interference (MMI) device such as a 2×2 MMI device. Other suitable light-combining components 28 include, but are not limited to, adiabatic splitters, and directional coupler. In some instances, the functions of the illustrated light-combining component 28 are performed by more than one optical component or a combination of optical components.

A single light sensor can replace the first light sensor 40 and the second light sensor 42 and can output the data signal. When a single light sensor replaces the first light sensor 40 and the second light sensor 42, the light-combining component 28 need not include light-splitting functionality. As a result, the illustrated light light-combining component 28 can be a 2×1 light-combining component rather than the illustrated 2×1 light-combining component. For instance, the illustrated light light-combining component can be a 2×1 MMI device. In these instances, the chip includes a single detector waveguide that carries the composite sample signal to the light sensor.

The data branch includes a data optical attenuator 44 positioned along the comparative waveguide 30 such that the data optical attenuator 44 can be operated so as to attenuate the comparative signal on the comparative waveguide 30. The chip also includes an output optical attenuator 46 positioned along the utility waveguide 16 such that the output optical attenuator 46 can be operated so as to attenuate the outgoing LIDAR signal on the utility waveguide 16. Suitable attenuators for the data optical attenuator 44 and/or the output optical attenuator 46 are configured to attenuate intensity of a light signal. Examples of a suitable attenuator configured to attenuate intensity of a light signal include carrier injection based PIN diodes, electro-absorption modulators, and Mach-Zehnder (MZ) modulators.

The chip also includes a sampling directional coupler 50 that couples a portion of the comparative signal from the comparative waveguide 30 onto a sampling waveguide 52. The coupled portion of the comparative signal serves as a sampling signal. The sampling waveguide 52 carries the sampling signal to a sampling light sensor 54. Although FIG. 1 illustrates a sampling directional coupler 50 moving a portion of the comparative signal onto the sampling waveguide 52, other signal tapping components can be used to move a portion of the comparative signal from the comparative waveguide 30 onto the sampling waveguide 52. Examples of suitable signal tapping components include, but are not limited to, y-junctions, and MMIs.

The chip includes a control branch 55 for controlling operation of the laser cavity. The control branch includes a directional coupler 56 that moves a portion of the outgoing LIDAR signal from the utility waveguide 16 onto a control waveguide 57. The coupled portion of the outgoing LIDAR signal serves as a tapped signal. Although FIG. 1 illustrates a directional coupler 56 moving portion of the outgoing LIDAR signal onto the control waveguide 57, other signal-tapping components can be used to move a portion of the outgoing LIDAR signal from the utility waveguide 16 onto the control waveguide 57. Examples of suitable signal tapping components include, but are not limited to, y-junctions, and MMIs.

The control waveguide 57 carries the tapped signal to an interferometer 58 that splits the tapped signal and then re-combines the different portions of the tapped signal with a phase differential between the portions of the tapped signal. The illustrated interferometer 58 is a Mach-Zehnder interferometer; however, other interferometers can be used.

The interferometer 58 outputs a control light signal on an interferometer waveguide 60. The interferometer waveguide 60 carries the control light signal to a control light sensor 61 that converts the control light signal to an electrical signal that serves as an electrical control signal. The interferometer signal has an intensity that is a function of the frequency of the outgoing LIDAR signal. For instance, a Mach-Zehnder interferometer will output a sinusoidal control light signal with a fringe pattern. Changes to the frequency of the outgoing lidar signal will cause changes to the frequency of the control light signal. Accordingly, the frequency of the electrical control signal output from the control light sensor 61 is a function of the frequency of the outgoing lidar signal. Other detection mechanisms can be used in place of the control light sensor 61. For instance, the control light sensor 61 can be replaced with a balanced photodetector arranged as the light combining component 28, the first light sensor 40 and the second light sensor 42.

Electronics 62 can operate one or more components on the chip. For instance, the electronics 62 can be in electrical communication with and control operation of the light source 10, the data optical attenuator 44, output optical attenuator 46, the first light sensor 40, the second light sensor 42, the sampling light sensor 54, and the control light sensor 61. Although the electronics 62 are shown off the chip, all or a portion of the electronics can be included on the chip. For instance, the chip can include electrical conductors that connect the first light sensor 40 in series with the second light sensor 42.

During operation of the chip, the electronics 62 operate the light source 10 such that the laser cavity outputs the outgoing LIDAR signal. The electronics 62 then operate the chip through a series of cycles where each cycle generates at least a distance data point. During each cycle, the data signal is sampled multiple times. During each of the samples, the electronics tune the frequency of the outgoing LIDAR signal. As will be described in more detail below, the electronics can employ output from the control branch in order to control the frequency of the outgoing LIDAR signal such that the frequency of the outgoing LIDAR signal as a function of time is known to the electronics. In some instance, a cycle includes a first sample and a second sample. During the first sample, the electronics 62 can increase the frequency of the outgoing LIDAR signal and during a second sample the electronics 62 can decrease the frequency of the outgoing LIDAR signal. For instance, the laser cavity can be configured to output an outgoing LIDAR signal (and accordingly a LIDAR output signal) with a wavelength of 1550 nm. During the first sample, the electronics 62 can increase the frequency of the outgoing LIDAR signal (and accordingly a LIDAR output signal) such that the wavelength decreases from 1550 nm to 1459.98 nm followed by decreasing the frequency of the outgoing LIDAR signal such that the wavelength increases from 1459.98 nm to 1550 nm.

When the outgoing LIDAR signal frequency is increased during the first sample, the LIDAR output signal travels away from the chip and then returns to the chip as a LIDAR input signal. A portion of the LIDAR input signal becomes the comparative signal. During the time that the LIDAR output signal and the LIDAR input signal are traveling between the chip and a reflecting object, the frequency of the outgoing LIDAR signal continues to increase. Since a portion of the outgoing LIDAR signal becomes the reference signal, the frequency of the reference signal continues to increase. As a result, the comparative signal enters the light-combining component with a lower frequency than the reference signal concurrently entering the light-combining component. Additionally, the further the reflecting object is located from the chip, the more the frequency of the reference signal increases before the LIDAR input signal returns to the chip. Accordingly, the larger the difference between the frequency of the comparative signal and the frequency of the reference signal, the further the reflecting object is from the chip. As a result, the difference between the frequency of the comparative signal and the frequency of the reference signal is a function of the distance between the chip and the reflecting object.

For the same reasons, when the outgoing LIDAR signal frequency is decreased during the second sample, the comparative signal enters the light-combining component with a higher frequency than the reference signal concurrently entering the light-combining component and the difference between the frequency of the comparative signal and the frequency of the reference signal during the second sample is also function of the distance between the chip and the reflecting object.

In some instances, the difference between the frequency of the comparative signal and the frequency of the reference signal can also be a function of the Doppler effect because relative movement of the chip and reflecting object can also affect the frequency of the comparative signal. For instance, when the chip is moving toward or away from the reflecting object and/or the reflecting object is moving toward or away from the chip, the Doppler effect can affect the frequency of the comparative signal. Since the frequency of the comparative signal is a function of the speed the reflecting object is moving toward or away from the chip and/or the speed the chip is moving toward or away from the reflecting object, the difference between the frequency of the comparative signal and the frequency of the reference signal is also a function of the speed the reflecting object is moving toward or away from the chip and/or the speed the chip is moving toward or away from the reflecting object. Accordingly, the difference between the frequency of the comparative signal and the frequency of the reference signal is a function of the distance between the chip and the reflecting object and is also a function of the Doppler effect.

The composite sample signal and the data signal each effectively compares the comparative signal and the reference signal. For instance, since the light-combining component combines the comparative signal and the reference signal and these signals have different frequencies, there is beating between the comparative signal and reference signal. Accordingly, the composite sample signal and the data signal have a beat frequency related to the frequency difference between the comparative signal and the reference signal and the beat frequency can be used to determine the difference in the frequency of the comparative signal and the reference signal. A higher beat frequency for the composite sample signal and/or the data signal indicates a higher differential between the frequencies of the comparative signal and the reference signal. As a result, the beat frequency of the data signal is a function of the distance between the chip and the reflecting object and is also a function of the Doppler effect.

As noted above, the beat frequency is a function of two unknowns; the distance between the chip and the reflecting object and the relative velocity of the chip and the reflecting object (i.e., the contribution of the Doppler effect). The change in the frequency difference between the comparative signal and the reference signal ($\Delta f$) is given by $\Delta f = 2\Delta v f/c$ where f is the frequency of the LIDAR output signal and accordingly the reference signal, $\Delta v$ is the relative velocity of the chip and the reflecting object and c is the speed of light in air. The use of multiple different samples permits the electronics 62 to resolve the two unknowns. For instance, the beat frequency determined for the first sample is related to the unknown distance and Doppler contribution and the beat frequency determined for the second sample is also related to the unknown distance and Doppler contribution. The availability of the two relationships allows the electronics 62 to resolve the two unknowns. Accordingly, the distance between the chip and the reflecting object can be determined without influence from the Doppler effect. Further, in some instances, the electronics 62 use this distance in combination with the Doppler effect to determine the velocity of the reflecting object toward or away from the chip.

In instances where the relative velocity of target and source is zero or very small, the contribution of the Doppler effect to the beat frequency is essentially zero. In these instances, the Doppler effect does not make a substantial contribution to the beat frequency and the electronics 62 can take only the first sample to determine the distance between the chip and the reflecting object.

During operation, the electronics 62 can adjust the frequency of the outgoing LIDAR signal in response to the electrical control signal output from the control light sensor 61. As noted above, the magnitude of the electrical control signal output from the control light sensor 61 is a function of the frequency of the outgoing LIDAR signal. Accordingly, the electronics 62 can adjust the frequency of the outgoing LIDAR signal in response to the magnitude of the control. For instance, while changing the frequency of the outgoing LIDAR signal during one of the samples, the electronics 62 can have a range of suitable values for the electrical control signal magnitude as a function of time. At multiple different times during a sample, the electronics 62 can compare the electrical control signal magnitude to the range of values associated with the current time in the sample. If the electrical control signal magnitude indicates that the frequency of the outgoing LIDAR signal is outside the associated range of electrical control signal magnitudes, the electronics 62 can operate the light source 10 so as to change the frequency of the outgoing LIDAR signal so it falls within the associated range. If the electrical control signal magnitude indicates that the frequency of the outgoing LIDAR signal is within the associated range of electrical control signal magnitudes, the electronics 62 do not change the frequency of the outgoing LIDAR signal.

During operation, the electronics 62 can adjust the level of attenuation provided by the output optical attenuator 46 in response to the sampling signal from the sampling light sensor 54. For instance, the electronics 62 operate the output optical attenuator 46 so as to increase the level of attenuation in response to the magnitude of the sampling signal being above a first signal threshold and/or decrease the magnitude of the power drop in response to the magnitude of the sampling signal being below a second signal threshold.

In some instance, the electronics 62 adjust the level of attenuation provided by the output optical attenuator 46 to prevent or reduce the effects of back-reflection on the performance of the laser cavity. For instance, the first signal threshold and/or the second signal threshold can optionally be selected to prevent or reduce the effects of back-reflection on the performance of the laser cavity. Back reflection occurs when a portion of the LIDAR input signal returns to the laser cavity as a returned LIDAR signal. In some instances, on the order of 50% of the LIDAR input signal that passes through the facet 18 returns to the laser cavity. The returned LIDAR signal can affect performance of the laser cavity when the power of the returned LIDAR signal entering the partial return device 14 does not decrease below the power of the outgoing LIDAR signal exiting from the partial return device 14 ("power drop") by more than a minimum power drop threshold. In the illustrated chip, the minimum power drop threshold can be around 35 dB (0.03%). Accordingly, the returned lidar signal can affect the performance of the laser cavity when the power of the returned LIDAR signal entering the partial return device 14 is not more than 35 dB below the power of the outgoing LIDAR signal exiting from the partial return device 14.

The electronics 62 can operate the output optical attenuator 46 so as to reduce the effect of low power drops, e.g. when the target object is very close or highly reflective or both. As is evident from FIG. 1, operation of the output optical attenuator 46 so as to increase the level of attenuation reduces the power of the returned LIDAR signal entering the partial return device 14 and also reduces the power of the returned outgoing LIDAR signal at a location away from the partial return device 14. Since the output optical attenuator 46 is located apart from the partial return device 14, the power of the outgoing LIDAR signal exiting from the partial return device 14 is not directly affected by the operation of the output optical attenuator 46. Accordingly, the operation of the output optical attenuator 46 so as to increase the level of attenuation increases the level of the power drop. As a result, the electronics can employ the optical attenuator 46 so as to tune the power drop.

Additionally, the magnitude of the sampling signal is related to the power drop. For instance, the magnitude of the sampling signal is related to the power of the comparative signal as is evident from FIG. 1. Since the comparative signal is a portion of the lidar input signal, the magnitude of the sampling signal is related to the power of the lidar input signal. This result means the magnitude of the sampling signal is also related to the power of the returned LIDAR signal because the returned LIDAR signal is a portion of the lidar input signal. Accordingly, the magnitude of the sampling signal is related to the power drop.

Since the magnitude of the sampling signal is related to the power drop, the electronics 62 can use the magnitude of the sampling signal to operate the output optical attenuator so as to keep the magnitude of the comparative signal power within a target range. For instance, the electronics 62 can operate the output optical attenuator 46 so as to increase the magnitude of the power drop in response to the sampling signal indicating that the magnitude of power drop is at or below a first threshold and/or the electronics 62 can operate the output optical attenuator 46 so as to decrease the magnitude of the power drop in response to the sampling signal indicating that the magnitude of power drop is at or above a second threshold. In some instances, the first threshold is greater than or equal to the minimum power drop threshold. In one example, the electronics 62 operate the output optical attenuator 46 so as to increase the magnitude of the power drop in response to the magnitude of the sampling signal being above a first signal threshold and/or decrease the magnitude of the power drop in response to the magnitude of the sampling signal being below a second signal threshold. The identification of the value(s) for one, two, three, or four variables selected from the group consisting of the first threshold, the second threshold, the first signal threshold, and the second signal threshold can be determined from calibration of the optical chip during set-up of the LIDAR chip system.

Light sensors can become saturated when the power of the composite light signal exceeds a power threshold. When a light sensor becomes saturated, the magnitude of the data signal hits a maximum value that does not increase despite additional increases in the power of the composite light signal above the power threshold. Accordingly, data can be lost when the power of the composite light signal exceeds a power threshold. During operation, the electronics 62 can adjust the level of attenuation provided by the data optical attenuator 44 so the power of the composite light signal is maintained below a power threshold.

An optical attenuator 48 can optionally be positioned along the reference waveguide 27 such that the electronics can operate the optical attenuator 48 so as to attenuate the reference signal on the reference waveguide 27. In some instances, it may be desirable to increase the power of the LIDAR output signal. The increased power can cause saturation of a light sensor such as the first light sensor 40 and/or the second light sensor 42. Accordingly, data can be lost when the power of the reference signal exceeds a power threshold. During operation, the electronics 62 can adjust the level of attenuation provided by the optical attenuator 48 so the power of the reference signal is maintained below a power threshold. Suitable attenuators for the optical attenuator 48 are configured to attenuate intensity of a light signal. Examples of a suitable attenuator configured to attenuate intensity of a light signal include carrier injection based PIN diodes, electro-absorption modulators, and Mach-Zehnder (MZ) modulators.

As is evident from FIG. 1, the magnitude of the sampling signal is related to the power of the comparative signal. Accordingly, the electronics 62 can operate the data optical attenuator 44 in response to output from the sampling signal. For instance, the electronics 62 can operate the data optical attenuator so as to increase attenuation of the comparative signal when the magnitude of the sampling signal indicates the power of the comparative signal is above an upper comparative signal threshold and/or can operate the data optical attenuator so as to decrease attenuation of the comparative signal when the magnitude of the sampling signal indicates the power of the comparative signal is below a lower comparative signal threshold. For instance, in some instances, the electronics 62 can increase attenuation of the comparative signal when the magnitude of the sampling signal is at or above an upper comparative threshold and/or the electronics 62 decrease attenuation of the comparative signal when the magnitude of the sampling signal is at or below an upper comparative signal threshold.

Figure 2:
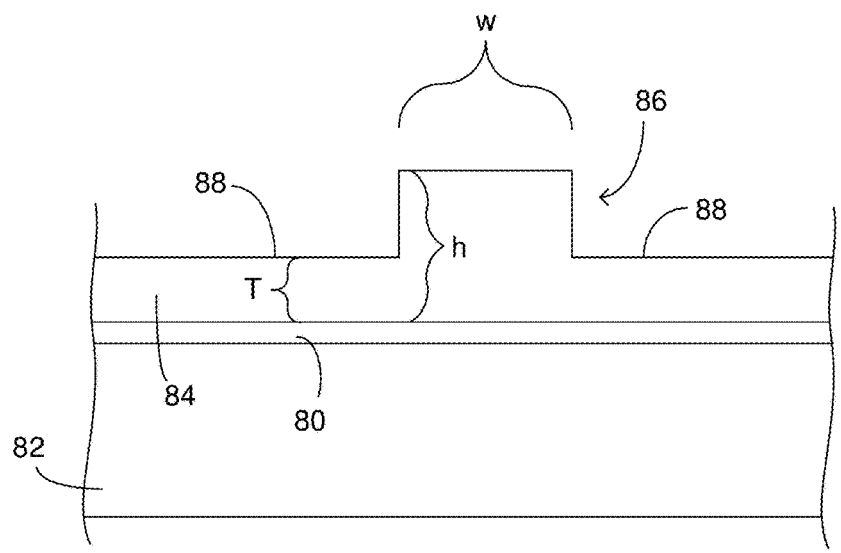
FIG. 2 is a cross-section of a LIDAR chip according to FIG. 1 constructed from a silicon-on-insulator wafer.

As noted above, the electronics 62 can adjust the level of attenuation provided by the output optical attenuator 46 in response to the sampling signal. The electronics 62 can adjust the level of attenuation provided by the data optical attenuator 44 in response to the sampling signal in addition or as an alternative to adjusting the level of attenuation provided by the output optical attenuator 46 in response to the sampling signal Suitable platforms for the chip include, but are not limited to, silica, indium phosphide, and silicon-on-insulator wafers. FIG. 2 is a cross-section of portion of a chip constructed from a silicon-on-insulator wafer. A silicon-on-insulator (SOI) wafer includes a buried layer 80 between a substrate 82 and a light-transmitting medium 84. In a silicon-on-insulator wafer, the buried layer is silica while the substrate and the light-transmitting medium are silicon. The substrate of an optical platform such as an SOI wafer can serve as the base for the entire chip. For instance, the optical components shown in FIG. 1 can be positioned on or over the top and/or lateral sides of the substrate.

The portion of the chip illustrated in FIG. 2 includes a waveguide construction that is suitable for use with chips constructed from silicon-on-insulator wafers. A ridge 86 of the light-transmitting medium extends away from slab regions 88 of the light-transmitting medium. The light signals are constrained between the top of the ridge and the buried oxide layer.

The dimensions of the ridge waveguide are labeled in FIG. 2. For instance, the ridge has a width labeled w and a height labeled h. A thickness of the slab regions is labeled T. For LIDAR applications, these dimensions are more important than other applications because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide while curved portions of the waveguide and/or tapered portions of the waveguide have dimensions outside of these ranges. For instance, the tapered portions of the utility waveguide 16 illustrated in FIG. 1 can have a width and/or height that is >4 µm and can be in a range of 4 µm to 12 µm. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2 is suitable for all or a portion of the waveguides selected from the group consisting of the cavity waveguide 12, utility waveguide 16, reference waveguide 27, comparative waveguide 30, first detector waveguide 36, second detector waveguide 38, sampling waveguide 52, control waveguide 57, and interferometer waveguide 60.

The light source 10 that is interfaced with the utility waveguide 16 can be a gain element that is a component separate from the chip and then attached to the chip. For instance, the light source 10 can be a gain element that is attached to the chip using a flip-chip arrangement.

Use of flip-chip arrangements is suitable when the light source 10 is to be interfaced with a ridge waveguide on a chip constructed from silicon-on-insulator wafer. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. The constructions are suitable for use as the light source 10. When the light source 10 is a gain element, the electronics 62 can change the frequency of the outgoing LIDAR signal by changing the level of electrical current applied to through the gain element.

The attenuators can be a component that is separate from the chip and then attached to the chip. For instance, the attenuator can be included on an attenuator chip that is attached to the chip in a flip-chip arrangement. The use of attenuator chips is suitable for all or a portion of the attenuators selected from the group consisting of the data attenuator and the control attenuator.

As an alternative to including an attenuator on a separate component, all or a portion of the attenuators can be integrated with the chip. For instance, examples of attenuators that are interfaced with ridge waveguides on a chip constructed from a silicon-on-insulator wafer can be found in U.S. Pat. No. 5,908,305, issued on Jun. 1, 1999; each of which is incorporated herein in its entirety. The use of attenuators that are integrated with the chip are suitable for all or a portion of the light sensors selected from the group consisting of the data attenuator and the control attenuator.

Light sensors that are interfaced with waveguides on a chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu Ciy, Japan, or an InGaAs APD (Avalanche Photo Diode) manufactured by Hamamatsu located in Hamamatsu City, Japan. These light sensors can be centrally located on the chip as illustrated in FIG. 1. Alternately, all or a portion the waveguides that terminate at a light sensor can terminate at a facet 18 located at an edge of the chip and the light sensor can be attached to the edge of the chip over the facet 18 such that the light sensor receives light that passes through the facet 18. The use of light sensors that are a separate component from the chip is suitable for all or a portion of the light sensors selected from the group consisting of the first light sensor 40, the second light sensor 42, the sampling light sensor 54, and the control light sensor 61.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,472, issued on Aug. 22, 2000 each of which is incorporated herein in its entirety. The use of light sensors that are integrated with the chip are suitable for all or a portion of the light sensors selected from the group consisting of the first light sensor 40, the second light sensor 42, the sampling light sensor 54, and the control light sensor 61.

Construction of optical gratings that are integrated with a variety of optical device platforms are available. For instance, a Bragg grating can be formed in a ridge waveguides by forming grooves in the top of the ridge and/or in the later sides of the ridge.

In some instances, it is desirable to scan the LIDAR output signal. The above chip construction is suitable for use with various scanning mechanisms used in LIDAR applications. For instance, the output LIDAR signal can be received by one or more steering devices and/or one or more collimating devices. The one or more steering devices can be configured to re-direct and/or steer the LIDAR output signal so as to provide scanning of the LIDAR output signal. Suitable steering devices include, but are not limited to, mirrors such mechanically driven mirrors and Micro Electro Mechanical System (MEMS) mirrors. The one or more collimating devices provide collimation of the LIDAR output signal and can accordingly increase the portion of the LIDAR input signal that is received in the utility waveguide 16. Suitable collimating devices include, but are not limited to, individual lenses and compound lenses.

Figure 3:
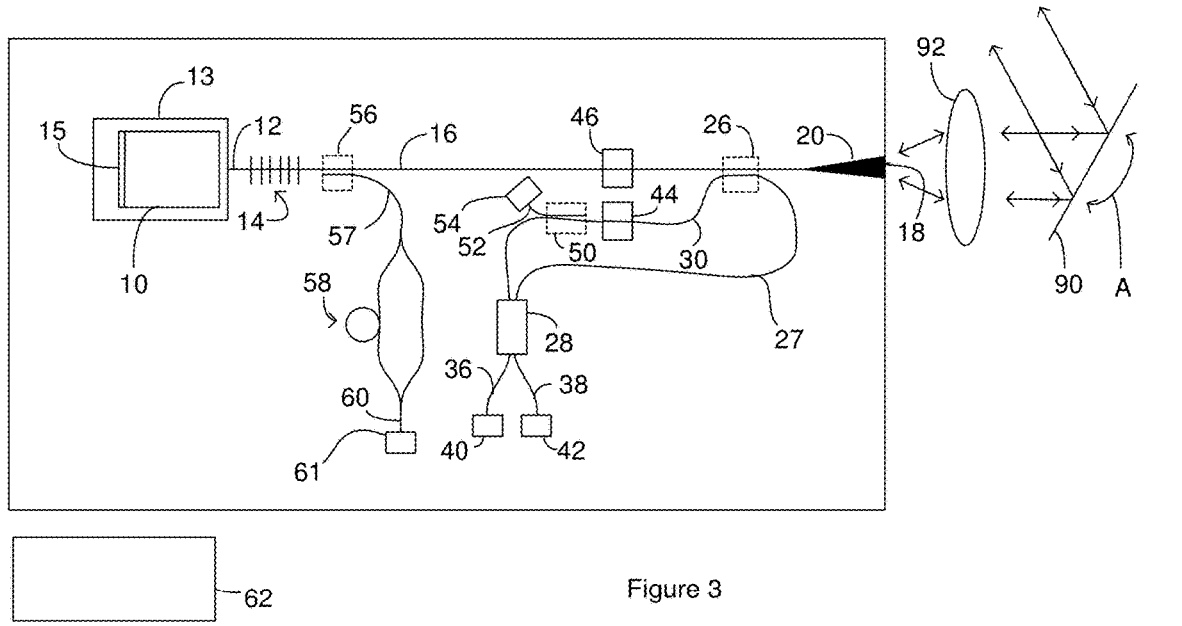
FIG. 3 illustrates the LIDAR chip of FIG. 1 used with an off-chip scanning mechanism.

FIG. 3 illustrates the above chip used with a steering device 90 and a collimating device 92. For instance, a lens serves as a collimating device that receives the LIDAR output signal and provides collimation of the LIDAR output signal. A mirror serves as a steering device 90 that receives the collimated LIDAR output signal and reflects the collimated LIDAR output signal in the desired direction. As is illustrated by the arrow labeled A, the electronics can move the mirror so as to steer the collimated LIDAR output signal and/or scan the collimated LIDAR output signal. The movement of the mirror can be in one dimension or two dimensions in that knowing one of the coordinates in a coordinate system defines the location of the mirror for one-dimensional movements as is the case with movements along a line and knowing two of the coordinates defines the location of the mirror in a two-dimensional movements as is the case with movements along a surface. Suitable mirrors include, but are not limited to, electromagnetically driven mirrors using devices such as voice coils, mechanically driven mirrors and Micro Electro Mechanical System (MEMS) mirrors.

Figure 4:
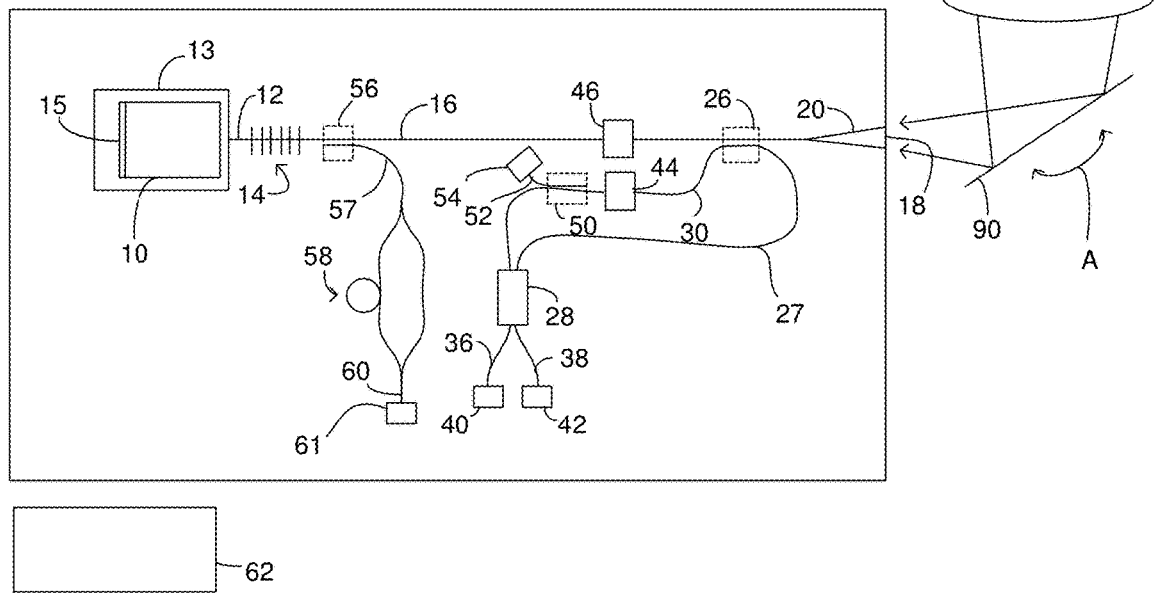
FIG. 4 illustrates the LIDAR chip of FIG. 1 used with another embodiment of an off-chip scanning mechanism.

FIG. 4 illustrates the above chip used with a steering device 90 and a collimating device 92. For instance, a mirror serves as a steering device 90 that receives the LIDAR output signal and reflects the LIDAR output signal in the desired direction. As is illustrated by the arrow labeled A, the electronics can move the mirror so as to steer the LIDAR output signal and/or scan the LIDAR output signal. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The movement of the mirror can be in two dimensions or three dimensions. Suitable mirrors include, but are not limited to, electromagnetically driven mirrors using devices such as voice coils, mechanically driven mirrors and Micro Electro Mechanical System (MEMS) mirrors.

Figure 5:
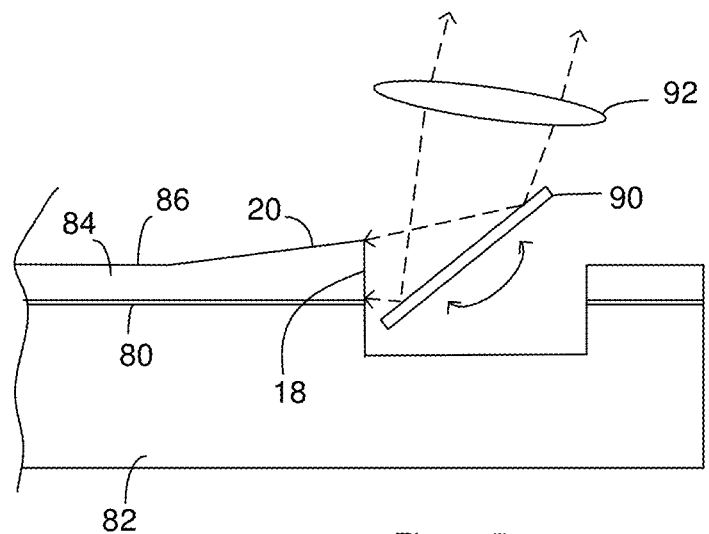
FIG. 5 is a cross section of the LIDAR chip of FIG. 1 having an integrated scanning mechanism.

Technologies such as SOI MEMS (Silicon-On-Insulator Micro Electro Mechanical System) technology can be used to incorporate a steering device such as a MEMS mirror into the chip. For instance, FIG. 5 is a cross section of a portion of the chip taken through the longitudinal axis of the utility waveguide 16. The illustrated chip was constructed on silicon-on-insulator waveguide. A recess 94 extends through the light-transmitting medium to the base. The mirror is positioned in the recess such that the mirror receives the LIDAR output signal from the utility waveguide. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The electronics can control movement of the mirror in two or three dimensions.

Figure 6A:
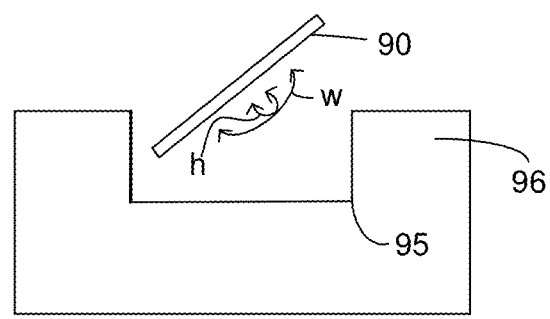
FIG. 6A is a cross section of a steering chip.

FIG. 6A is a cross section of a steering chip that includes a suitable steering device 90. Suitable steering devices 90 include, but are not limited to, diffractive devices such as gratings or diffractive optical elements (DOEs), and reflecting devices such as mirrors. The illustrated steering device is a mirror. A recess 95 extends into a support material 96. The steering device 90 is positioned in the recess 95. The electronics (not shown) can control movement of the mirror in one dimension (the line labeled w in FIG. 6A and providing direction to sample regions positioned along a straight line or a curved line in a field of view) or two dimensions (the lines labeled h and w in FIG. 6A and providing direction to sample regions in a curved or flat planar field of view) depending on application. Suitable support materials include, but are not limited to, silicon, glass, and ceramics. In some instances, the steering chip is a MEMs chip. Although not shown, the MEMs chip can optionally include a sealing structure that prevents airborne particulates and/or air or moisture from coming into contact with the steering device.

Figure 6B:
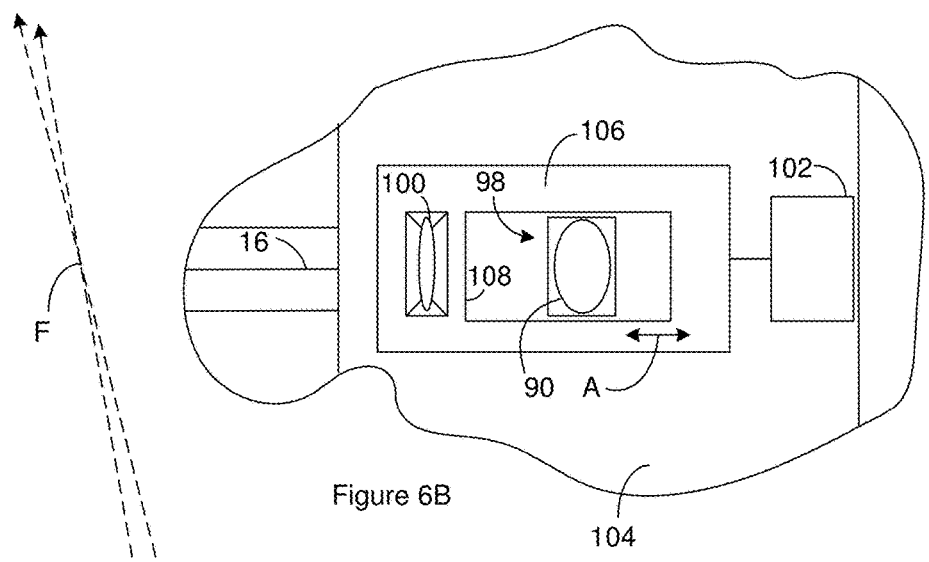
FIG. 6B and FIG. 6C illustrate a LIDAR system that includes a steering chip such as the steering chip of FIG. 6A.
Figure 6C:
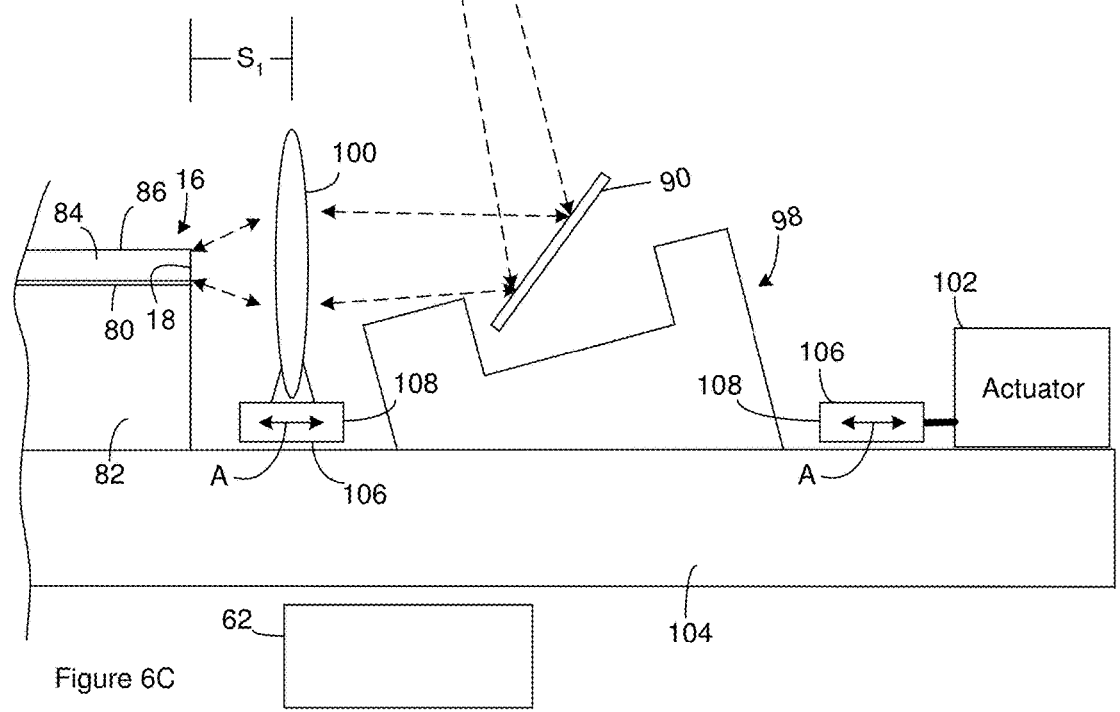

FIG. 6B and FIG. 6C illustrate a LIDAR system that includes a steering chip 98 such as the steering chip of FIG. 6A. FIG. 6B is a topview of the LIDAR system. FIG. 6C is a cross section of the LIDAR system taken along the longitudinal axis of the utility waveguide 16. The steering chip 98, lens 100, the LIDAR chip, and an actuator 102 are positioned on a common support 104. Suitable common supports include, but are not limited to, substrates, platforms, stages, and Printed Circuit Boards (PCB).

The steering chip 98, lens 100, and the LIDAR chip are arranged on the common support such that a LIDAR output signal that exits the LIDAR chip through the facet 18 of the LIDAR chip passes through the lens and is received at the steering device 90 on the steering chip 98. The LIDAR output signal is reflected by the steering device. The electronics 62 can operate the steering chip 98 so as to steer the direction that the LIDAR output signal travels away from the steering device. Accordingly, the electronics 62 can steer the LIDAR output signal to a series of sample regions in a field of view.

The actuator 102 is configured to move the lens and/or the LIDAR chip relative to one another. In particular, the actuator is configured to move the lens and/or the facet 18 of the LIDAR chip relative to one another. For instance, the actuator can move the LIDAR chip while the lens remains stationary on the common support 104 or the actuator can move the lens while the LIDAR chip remains stationary on the common support 104. Alternately, the actuator can move the LIDAR chip and the lens on the common support 104.

In the embodiment of the LIDAR system shown in FIG. 6B and FIG. 6C, the actuator is configured to move the lens while the LIDAR chip remains stationary on the common support 104. The lens is mounted on a lens support 106 that can be moved on the common support 104. For instance, one or more bearings, low friction sliding contact(s), and/or flexure mount(s) can be positioned between the lens support 106 and the common support 104. The steering chip 98, the LIDAR chip, and the actuator 102 can be stationary on the common support 104. For instance, the steering chip 98, the LIDAR chip, and the actuator 102 can be immobilized on the common support 104. The lens support can include an opening 108 that extends through the lens support 106. The steering chip 98 can be positioned in the opening with the sides of the opening spaced apart from the steering chip 98. The actuator is configured to move the lens support on the common platform as illustrated by the arrows labeled A in FIG. 6B and FIG. 6C. This movement of the lens support causes movement of the lens toward and away from the facet 18 of the LIDAR chip. Accordingly, this movement changes the displacement distance between the center of the lens and the facet 18 of the LIDAR chip (labeled $S_1$ in FIG. 6C. Suitable lens supports include, but are not limited to, moulded plastic mountings. Suitable actuators include, but are not limited to, piezoelectric actuators, and electromechanical motors. Changing the displacement distance causes a change to the location of the focal point (F) relative to the center of the lens and to the image distance (distance the LIDAR output signal travels between the center of the lens and the focal point). Accordingly, the electronics can tune the displacement distance over a displacement range before, after, or during generation of the LIDAR output signal. In some instances, the displacement range is larger than 0.05, 0.1, and 0.2 mm and/or less than 0.3, 0.5, or 1 mm. For instance, the minimum value of the displacement distance can be greater than 0, 0.1, or 0.2 mm and the maximum value of the displacement distance can be less than 0.5, 0.7, or 1.2 mm. Additionally or alternately, the electronics can tune the image distance over a focal range. In some instances, the focal range is larger than 0.1, 0.25, and 0.5 m and/or less than 1, 1.5, or 2 m. For instance, the minimum value of the focal range can be greater than 0.05, 0.5, or 1 m and the maximum value of the focal range can be less than or equal to 2 m, 10 m, or infinity.

As is evident from FIG. 6C, the width of the LIDAR output signal decreases as the LIDAR output signal approaches the image distance and then increases as the LIDAR output signal travels past the focal point. As a result, the electronics 62 can operate the actuator so as to tune the displacement distance and accordingly tune the image distance and the location of the focal point. For instance, the electronics can tune the location of the focal point F relative to the field distance where the field distance is the total distance the LIDAR output signal travels between the center of the lens and the field of view. As an example, the electronics can tune the location of the focal point F so as to narrow the width of the LIDAR output signal at the field of view. Accordingly, the electronics can tune the image distance so as to increase the resolution that can be achieved by the LIDAR system.

Figure 7A:
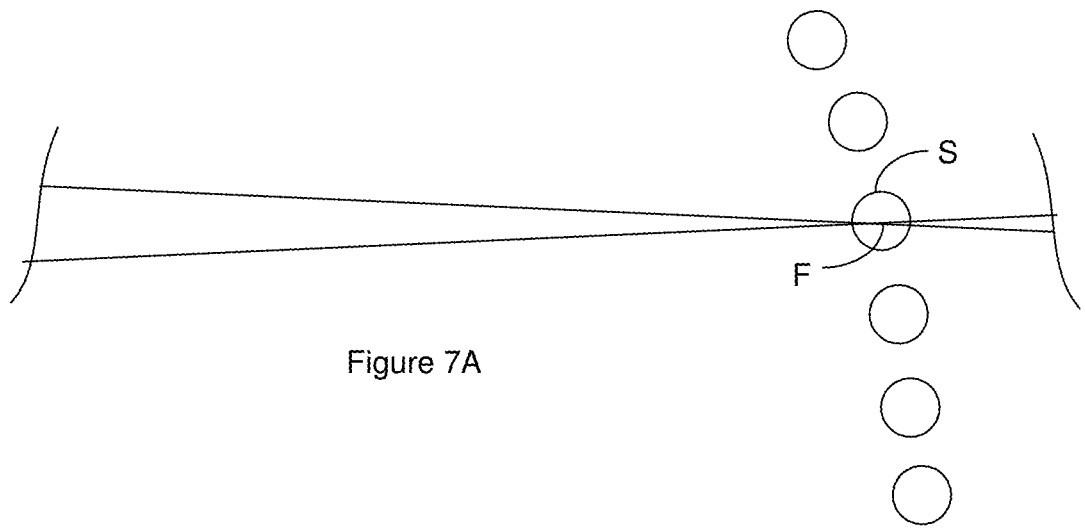
FIG. 7A illustrates several sample regions in a field of view having the sample regions arranged along a line.

In some instances, the electronics tune the location of the focal point F so as to move the focal point closer to the field of view. In some instances, the electronics tune the location of the focal point F such that the focal point can be steered to one or more locations within the field of view without further tuning of the focal point. As an example, FIG. 7A illustrates several sample regions in a field of view having the sample regions arranged along a line. During operation of the LIDAR system, the LIDAR output signal is directed to the each of the sample regions on the line. In FIG. 7A, the image distance is tuned such that the image distance is equal to the field distance. As a result, the focal point, F, can be located within the field of view at one or more locations within the field of view. FIG. 7A shows the focal point, F, located within the sample region labeled S. The field of view in FIG. 7A includes sample regions arranged along a curved line; however, the sample regions can be arranged along a straight line.

Figure 7B:
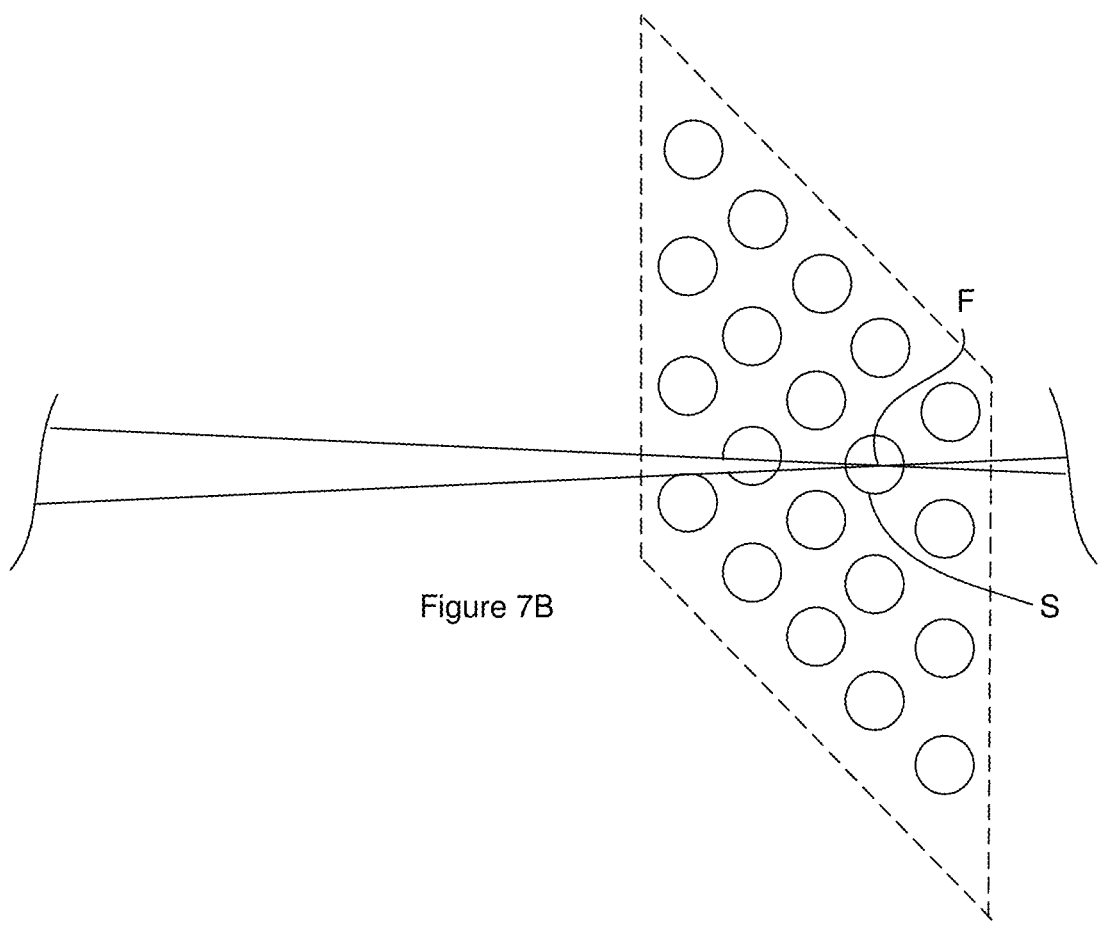
FIG. 7B illustrates several sample regions in a field of view having the sample regions arranged in a plane.

FIG. 7B illustrates several sample regions in a field of view having the sample regions arranged along in a plane. During operation of the LIDAR system, the LIDAR output signal is directed to the each of the sample regions in the field of view. In FIG. 7B, the image distance is tuned such that the image distance is equal to the field distance. As a result, the focal point, F, can be located within the field of view at one or more locations within the field of view. The locations can be within sample region or between sample regions. FIG. 7B shows the focal point, F, located within the sample region labeled S. The field of view in FIG. 7B includes sample regions arranged in a flat plane; however, the sample regions can be arranged in a flat or curved surface.

Figure 8A:
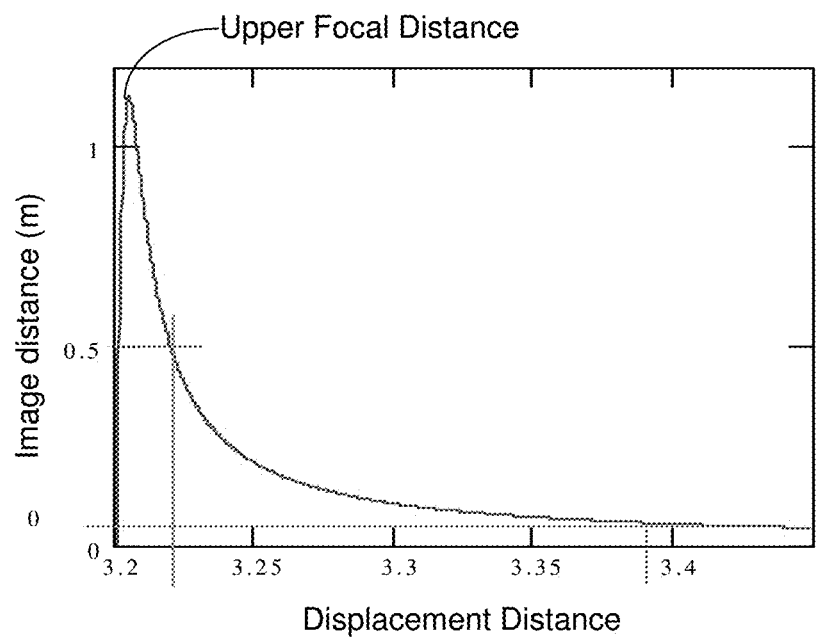
FIG. 8A is a graph of image distance versus displacement distance for a LIDAR chip constructed on a silicon-on-insulator wafer.
Figure 8B:
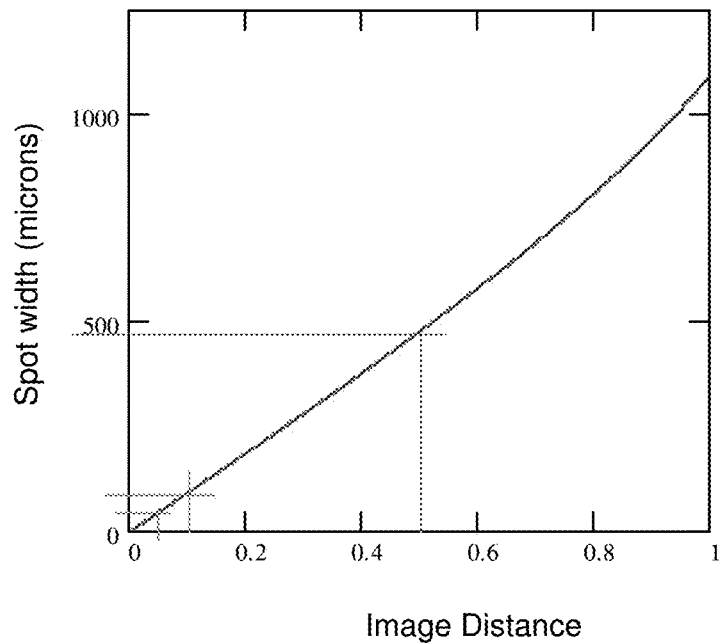
FIG. 8B is a graph of spot size versus the image distance.

In some instances, the focal point can be tuned to focal distances up to an upper image distance. For instance, there are some conditions where the LIDAR output signal can be approximated as a Gaussian beam. For instance, when a LIDAR chip is constructed on a platform such as a silicon-on-insulator wafer, the LIDAR output signal can be approximated as a Gaussian beam. In Gaussian optics, the image distance has a maximum. To illustrate this point, FIG. 8A provides a graph of image distance versus displacement distance for a LIDAR chip constructed on a silicon-on-insulator wafer with a utility waveguide that does not include a taper at the facet and where the silicon-on-insulator wafer has a height (labeled h in FIG. 1B) of 3 μm (corresponding to a LIDAR output signal with a width of 3 μm) and a lens with a 4 mm diameter and a focal length of 3.2 mm. Additionally, FIG. 8B shows the spot size versus the image distance for the LIDAR chip of FIG. 8A. When focusing at the upper image distance of ~1.1 m, the spot diameter is ~1 mm (1000 μm). The beam will continue to diverge at distances past the focal point. When the LIDAR system provides a LIDAR output signal that is not Guassian, there may not be an upper image distance.

In some instances, the displacement range includes a collimation displacement where the LIDAR output signal exiting from the lens is collimated. While collimation is normally associated with an infinite image distance, when the LIDAR output system is subject to Gaussian optics, collimation can be achieved but an infinite image distance can be difficult to achieved. For instance, displacement distances greater than the collimation displacement can provide the focusing of the LIDAR output signal shown in FIG. 6C. Reducing the displacement distance to the collimation displacement provides the collimation of the LIDAR output signal.

In some instances, the electronics can alternate between the focusing of the LIDAR output signal shown in FIG. 6C and collimation of the LIDAR output signal. For instance, in some instances, a spot size transition occurs at a transition distance from the lens. Between the lens and the transition distance, the spot size of the focused LIDAR output signal is smaller than the spot size of the collimated LIDAR output signal. However, at distances larger than the transition distance, the spot size of the collimated LIDAR output signal is smaller than the spot size of the focused LIDAR output signal. Accordingly, in some instances, the electronics can tune the displacement distance between generating the collimated LIDAR output signal and generating the focused LIDAR output signal. For instance, when the field distance is located at a location where the spot size of the collimated LIDAR output signal is smaller than the spot size of the focused LIDAR output signal, the electronics can tune the displacement distance so as to generate the collimated LIDAR output signal but when the field distance is located at a location where the spot size of the collimated LIDAR output signal is larger than the spot size of the focused LIDAR output signal, the electronics can tune the displacement distance so as to generate the focused LIDAR output signal. As another example, when the field distance is less than the transition distance, the electronics can tune the displacement distance so as to generate the focused LIDAR output signal and when the field distance is greater than the transition distance, the electronics can tune the displacement distance so as to generate the collimated LIDAR output signal. Instances where tuning between the collimated LIDAR output signal and the focused LIDAR output signal is desirable can be when an upper image distance exists and the field of view can be located past the upper image distance. In some instances, the electronics tune the focal distance such that the spot size at the field of view is greater than 1, 10, or 100 μm and/or less than 1, 10, or 100 mm.

The above LIDAR system can be employed in devices such as cell phones, hand-held 3D scanners, 3D scanner instrumentation, and vehicles, robots and drones requiring 3D scanning capability, such as cars, aircraft, sea surface craft, undersea craft and spacecraft. Applications for the above LIDAR system include, but are not limited to, facial recognition and recognition of other biometric indicators such as fingerprints, room scanning, site surveying, navigation, and industrial automation. The field distance can be different for many of these applications and/or an application can use different field distances.

The electronics can use a variety of different mechanisms for identifying the field distance that is to be used during the generation of LIDAR data. For instance, a device can have different mode setting that are each associated with a different field distance. As an example, a device such as a phone or camera can have a facial recognition mode and a room-scan mode. When the device is in facial recognition mode, the electronics can use a first field distance associated with the facial recognition mode. When the device is in room-scan mode, the electronics can use a second field distance associated with the room-scan mode. Additionally or alternately, an operator can enter the field distance into the device using a user interface. Additionally or alternately, the device can include an auto-focus mechanism that measures field distance. The auto-focus can be included in the electronics or can be part of an alternate application in the device. For instance, the auto-focus can be the auto-focus of a camera included in device. The field distance determined from the auto-focus can be provided to the electronics from the alternate application. The electronics can use the provided field distance as the field distance for the field of view in the LIDAR application or can perform additional processing of the provided field distance to determine the field that is used as the field distance for the field of view in the LIDAR application. As an example, the electronics can use the result of multiplying the provided field distance by a factor to generate the field distance of the field of view in the LIDAR application.

The electronics can tune the focal distance in response to the electronics identifying a new field distance. For instance, the electronics can identify a first field distance in response to a change marker such as the LIDAR application being started up or the LIDAR application indicating that the field distance has changes. If it is possible for the electronics to move the focal point closer the first field distance, the electronics can tune the focal point so as to move the focal point from its current location to a first focal distance that is closer to the first field distance than the focal point's current location. Subsequently, the electronics can identify a second field distance in response to another change marker such as the LIDAR application indicating that the field distance has changed. When it is possible for the electronics to move the focal point closer the second field distance, the electronics can tune the focal point so as to move the focal point closer from the first focal distance to a second focal distance that this closer to the second field distance than the first focal distance. The process of identifying a new field distance and moving the focal point closer to the newly identified field distance can be repeated. As noted above, in instances where an upper image distance exists and the newly identified field distance exceeds an image distance threshold, the electronics can tune the focal distance to the infinite focal distance associated with a collimated LIDAR output signal. In some instances, the image distance threshold is greater than or equal to the upper image distance. In one example, the image distance threshold is greater than or equal to twice the upper image distance.

In addition to the above mechanisms for tuning the image distance, other mechanisms for tuning the image distance can be employed. For instance, tuning the focal length of the lens can be used to tune the image distance in addition to or as an alternative to the tuning mechanism(s) disclosed above.

Suitable electronics can include, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the laser cavity is shown as being positioned on the chip, all or a portion of the laser cavity can be located off the chip. For instance, the utility waveguide 16 can terminate at a second facet through which the outgoing LIDAR signal can enter the utility waveguide 16 from a laser cavity located off the chip.

The chip can include components in addition to the illustrated components. As one example, optical attenuators (not illustrated) can be positioned along the first detector waveguide 36 and the second detector waveguide 38. The electronics can operate these attenuators so the power of the first portion of the composite sample signal that reaches the first light sensor 40 is the same or about the same as the power of the second portion of the composite sample signal that reaches the second light sensor 42. The electronics can operate the attenuators in response to output from the first light sensor 40 which indicates the power level of the first portion of the composite sample signal and the second light sensor 42 which indicates the power level of the second portion of the composite sample signal.

In the LIDAR system disclosed above, the steering chip is optional. As a result, the LIDAR system can exclude the steering chip. In some instances, the LIDAR system is constructed and/or operated as disclosed above but excludes the steering chip and the LIDAR output signal travel directly from the lens to the field of view.

The LIDAR chip disclosed above is only one example of a LIDAR chip that is suitable for use with the disclosed LIDAR system and other LIDAR chip constructions can be employed. For instance, the LIDAR chip can be constructed so as to generate a LIDAR output signal that includes multiple different channels that are each at a different wavelength and LIDAR data (the radial distance and/or radial velocity between the LIDAR chip and the object reflecting the LIDAR output signal) can be generated for each of the different channels. Examples of suitable LIDAR chips that generate LIDAR output signal that include multiple channels are found in U.S. Patent Application Ser. No. 64/745,225, filed on Oct. 12, 2018, and incorporated herein in its entirety. Additionally or alternatively, the LIDAR chip can include one or more other steering mechanisms for steering the direction that the LIDAR output signal travels away from the LIDAR chip. Examples of suitable LIDAR chips that include additional steering mechanisms are found in U.S. Patent Application Ser. No. 62/680,787, filed on Apr. 12, 2018, U.S. Patent Application Ser. No. 62/680,716 filed on Apr. 1, 2018, and U.S. Patent Application Ser. No. 62/683,958, filed on Jun. 12, 2018, each of which is incorporated herein in entirety.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a LIDAR chip that generates a LIDAR output signal that exits from a waveguide on the LIDAR chip; and
optics that receive the LIDAR output signal from the waveguide, the optics include a lens that receives the LIDAR output signal from the waveguide; and
electronics that tune a displacement distance between the lens and a facet through which the LIDAR output signal exits the waveguide so as to tune an image distance at which the LIDAR output signal is focused after exiting from the optics.

2. The LIDAR system of claim 1, wherein a range over which the image distance is tuned includes collimation of the LIDAR output signal.

3. The LIDAR system of claim 1, wherein a steering chip receives the LIDAR output signal from the optics, the steering chip being configured to change a direction of the LIDAR output signal away from the direction in which the LIDAR output signal was traveling when received by the steering chip.

4. The LIDAR system of claim 3, wherein the electronics are configured to operate the steering chip so as to direct the LIDAR output signal to different sample regions in a field of view.

5. The LIDAR system of claim 1, wherein the electronics are configured to use light from the LIDAR output signal to calculate LIDAR data for an object located off of the LIDAR chip that reflected the LIDAR output signal.

6. The LIDAR system of claim 1, wherein the electronics are configured to use light from the LIDAR output that was reflected by an object located remotely from the LIDAR chip and then received by the LIDAR chip to calculate LIDAR data for the object.

7. A method of operating a LIDAR system, comprising:
outputting a LIDAR output signal from a LIDAR chip;
receiving the LIDAR output signal from the LIDAR chip at a lens;
tuning a displacement distance between the lens and a facet from which the lens receives the LIDAR output signal so as to tune an image distance at which the LIDAR output signal is focused; and
generating LIDAR data from light that was included in the LIDAR output signal, the LIDAR data including a radial distance and/or radial velocity between the LIDAR chip and an object that reflected the LIDAR output signal and is located remotely from the LIDAR chip.

8. The method of claim 7, wherein a range over which the image distance is tuned includes a range where collimation of the LIDAR output signal occurs.

9. The method of claim 7, wherein the LIDAR output signal is generated by the LIDAR chip.

10. The method of claim 7, wherein a steering chip receives the LIDAR output signal from optics that include the lens, the steering chip being configured to change a direction of the LIDAR output signal away from the direction in which the LIDAR output signal was traveling when received by the steering chip.

11. The method of claim 10, wherein the electronics are configured to operate the steering chip so as to direct the LIDAR output signal to different sample regions in a field of view.

12. The method of claim 7, wherein electronics are configured to use light from the LIDAR output signal to calculate LIDAR data for an object located off of the LIDAR chip that reflected the LIDAR output signal.

13. The method of claim 7, wherein electronics are configured to use light from the LIDAR output signal after the LIDAR output signal was reflected by an object located remotely from the LIDAR chip and then received by the LIDAR chip to calculate LIDAR data for the object.

14. The method of claim 13, wherein the LIDAR chip is a Photonic Integrated Circuit (PIC).

* * * * *